Patented Jan. 16, 1940

2,187,050

UNITED STATES PATENT OFFICE 2,187,050

PROCESS FOR PRODUCING TITANIUM PIGMENTS

Gordon D. Patterson, Wilmington, Del., assignor to E. I. du Pont de Nemours & Company, Wilmington, Del., a corporation of Delaware No Drawing. Application April 23, 1937,
Serial No. 138,537

10 Claims. (Cl. 134—58)

This invention relates to the production of stable titanium pigments and more particularly to the production of weather-resistant titanium oxide and extended titanium oxide pigments.

Titanium pigments employed in paints and similar coating compositions chalk and fade badly on exposure to weathering influences and light. Additionally, when employed in interior paints or high temperature baking enamels, such pigments exhibit a marked tendency towards discoloration or yellowing. These properties are obviously very objectionable and seriously and adversely affect the utility of such pigments.

It is among the objects of this invention to overcome these objectionable features in prior titanium pigments, and to provide a treated and improved pigment which is remarkably stable and resistant against weathering, discoloration, chalking or lack of tint retention.

A further and particular object of the invention includes the production of a titanium pigment which is substantially free from soluble salts, and the provision of a process for treating such pigments which eliminates and avoids the introduction of soluble salts into the pigment during treatment. This is very advantageous, since the adsorptive nature of the pigment is such that soluble salts cannot be completely removed by washing, and, unless such salts are present in the pigment only to a negligible extent, they exert a severe and adverse effect upon the durability characteristics of exterior paints and coating compositions in which the pigment is employed.

In the treatment of titanium pigments to impart desired stability and resistance towards weathering and discoloration, it has been considered essential that precipitation of an insoluble treating agent, such as hydrated aluminum oxide, be effected in the presence of suspended particles of the pigment. I have found, however, that this is not necessary and that improved and unexpected results obtain if the treating agent is separately prepared and then incorporated in the pigment, provided certain conditions are observed and maintained during the process.

The foregoing objects and advantages, as well as others, are obtainable in my invention, which broadly comprises separately precipitating and preparing a relatively insoluble compound of aluminum from a water-soluble aluminum salt, and thereafter incorporating or blending the same with a suitable slurry or suspension of a titanium pigment.

In a more specific and preferred embodiment, the invention comprises effecting the separate precipitation of hydrated aluminum oxide in aqueous medium by addition of a precipitant basic towards aluminum sulfate, treating the resulting precipitate and thereafter incorporating the same, without drying, in a suspension or slurry of titanium oxide.

In one practical adaptation of the invention, a water solution of aluminum sulfate is prepared, and a basic precipitant, such as an alkaline agent, is added to the solution during agitation. Precipitant addition is continued until adjustment of the pH of the mixture to neutralization results and a precipitate of hydrated aluminum oxide is obtained. After precipitation of the hydrated aluminum oxide or basic aluminum compound, it is then washed free of soluble salts by decantation, filtration, or other suitable means, drying of the precipitate being avoided during such aftertreatment. An aqueous slurry or suspension of the purified product is then prepared and blended with a slurry or suspension of a titanium pigment. In order to obtain and insure uniform incorporation of the agent throughout the pigment, the mixture is thoroughly agitated, after which the treated pigment is filtered, dried, and made ready for use as in instances of untreated pigments.

In order that the invention may be more clearly understood, the following specific example is given, being merely illustrative, and not intended to limit the precipitation method to any specific set of conditions or to the concentrations employed therein:—

EXAMPLE

15 parts by weight of $Al_2(SO_4)_3.18H_2O$ was dissolved in approximately 250 parts by weight of water. Dilute ammonium hydroxide was then slowly added with good agitation until the slurry had a pH of about 7.0 to 7.2. The precipitated hydrated aluminum oxide was then washed by decantation and by filtering to remove soluble salts. The wet precipitate was then reslurried in sufficient water to give a total amount of about 250 parts by weight. This suspension was then added to a water slurry of titanium oxide pigment containing 230 parts by weight of titanium oxide. The pigment slurry was then filtered and the pigment dried and dry ground, after which it was ready for use.

I have found that it will be very desirable to effect precipitation and washing of the agent in the cold and that it will be necessary to maintain the agent in moistened state previous to incorporating the same in the pigment. If the agent is allowed to dry previous to use, it will be found that its effectiveness will become greatly diminished. Accordingly, drying of the agent must be avoided prior to use. The necessary effectiveness obtainable with permissible quantities of agent will be found to result only when the agent is incorporated in the pigment without previous drying and preferably while in freshly precipitated condition.

The desirability of avoiding drying of the agent at any stage of the preparation procedure and of adding the precipitated hydrated aluminum oxide as a water slurry to the slurry of the titanium oxide pigment is more concretely illustrated by the following example:

Baking enamels based on a drying oil modified polyhydric alcohol-polybasic acid resin vehicle were prepared, one pigmented with a pigment treated according to the process of this invention and the other pigmented with untreated titanium oxide to which had been added the dried precipitated hydrated aluminum oxide. These enamels were sprayed on metal panels, baked, and exposed indoors in a well-lighted room, and after about twelve months' exposure, the panels were graded using an arbitrary numerical scale in which one unit represented a definite visual difference in degree of discoloration. The enamel containing the pigment prepared according to this invention showed a superiority of approximately 12 units compared with the enamel containing the precipitated and dried hydrated aluminum oxide which had been added to the dry pigment during the preparation of the enamel.

Additional data on exposures of enamels formulated with my treated pigments are given hereunder in the table. In these tests the treated titanium oxide was the sole pigment and the vehicle was a polyhydric alcohol-polybasic acid enamel of the type used in the manufacture of white interior finishes. The panels were spray coated and the dried film exposed to diffuse daylight in the laboratory with half of the panel covered so as to note differential yellowing between the two portions.

After three months the films were measured by spectro-photometric methods. The more important data obtained are given.

*Table*

| Sample | Percent Al | Time exposed | Dominant wave length | Excitation purity |
|---|---|---|---|---|
| | | Months | | Percent |
| 1 | 0 | 0 | 560 | 1.2 |
| | | 3 | 570 | 5.0 |
| 2 | 1 | 0 | 551 | 0.5 |
| | | 3 | 491 | 0.8 |
| 3 | 2 | 0 | 548 | 0.5 |
| | | 3 | 545 | 0.7 |

In the above table the dominant wave length and excitation purity for both the exposed and the unexposed portions are given. The excitation purity is a measure of the deviation of a near white from a neutral white in the direction of the dominant wave length. (See "Handbook of Colorimetry" by A. C. Hardy, Technology Press, Mass. Institute of Technology, 1936, page 12.) The higher the value for excitation purity the greater the deviation from neutral white or, in the case under consideration, the more yellow the film.

It is to be noted that the exposed enamels made from my treated pigments gave noticeably lower values for excitation purity as compared to the untreated control and therefore a whiter appearance. This differential yellowing is of such magnitude that it can be noticed by an untrained observer at some distance from the panel. Furthermore the exposed and unexposed portions of the panel have similar appearances when using my treated pigment whereas the exposed portion is quite yellow in the case of the untreated pigment.

From the foregoing, it will be observed that in order to obtain maximum and optimum benefits under the invention, it will be desirable to observe and maintain the following conditions: (1) separate precipitation, preparation and washing of the agent in the cold; (2) immediate blending of the agent with the pigment slurry; (3) avoidance of agent drying at any time during its preparation; (4) adding the agent in the form of an aqueous suspension or slurry to the pigment, accompanied by thorough agitation to insure uniform distribution with the pigment.

The amount of agent applied to the pigment can be varied to suit individual requirements, but for most purposes amounts not exceeding substantially 2% of agent, based on the weight of the pigment, will be found satisfactory. While the amount of agent utilizable is subject to variance, I have found it preferable to employ an amount equivalent to approximately 1%, based on the weight of the pigment. Smaller amounts, as low as about 0.3% or even 0.1% of added agent will also be found useful. To obtain maximum benefits under the invention, however, I preferably employ an amount of hydrated aluminum oxide ranging from substantially 0.3% to 1.5% calculated as aluminum oxide, and based on weight of pigment. Amounts as high as 5–10% may be also utilized.

In the preparation of agent from aluminum sulfate, precipitants which give a basic aluminum compound plus a water-soluble salt are preferred. Accordingly, while my process has been specifically illustrated employing ammonium hydroxide as a precipitating agent, other alkaline agents, such as sodium or potassium hydroxide or sodium or potassium carbonate, may be employed with equal effectiveness. Similarly, examples of other materials basic towards aluminum sulfate include trisodium phosphate and borax, and accordingly the compound of aluminum which is precipitated may consist of hydrated aluminum oxide, a basic aluminum salt, or an aluminum salt such as a phosphate or mixtures of these compounds. The term "precipitating agent", therefore, as here employed and in the appended claims, is intended to generically embrace these types of agents.

While the invention has been illustratively described employing aluminum sulfate as the water-soluble aluminum salt, it is to be understood that the use of this agent is preferred because of its reactivity, low cost, and availability. Any other water-soluble salt of aluminum may be employed in lieu thereof, such as aluminum nitrate or the halogen salts of aluminum, including aluminum bromide, aluminum chloride, aluminum iodide, both simple and complex.

From the foregoing, it will be seen that the pigment treating agent of my improved process is prepared in a separate step, which means that preparation and washing of the agent can be carried out independently, using small scale equipment compared with the equipment which would be required to wash the pigment plus the co-precipitated agent. This is particularly significant when consideration is given to the fact that the amount of precipitated agent used represents only a very small percentage of the total pigment. If the large volume of pigment is to be washed without undue process delays, it means that additional washing equipment and storage space must be provided. By separate preparation and washing of the precipitated agent followed by blending with the titanium oxide slurry, the pigment can be handled in the same filtering equipment and on the same time schedule as normally would be used for the untreated product. Separate preparation of the treating agent also has another definite advantage in that it is more convenient to prepare pigments containing varying amounts of agent. Pigments prepared for various uses obviously have different requirements and for certain applications different amounts of the treating agent are most satisfactory. Furthermore, there are numerous uses for which a treated pigment is not required. It is at once apparent then that several different pigments can be prepared and marketed from the same titanium oxide source material. The treated pigments therefore may be looked upon as specialty products and may represent only a portion of the production of a titanium oxide pigment plant. The preparation of these various products can be easily and conveniently carried out if the treating process simply involves the blending of the previously precipitated and washed agent with the titanium oxide pigment slurry at some convenient point in the finishing process. The treated pigment can then be filtered and handled in the same equipment as normally used in the process with a minimum of added equipment and processing costs.

In addition to the foregoing, other important advantages are afforded by the invention. By separate precipitation and preparation of the treating agent prior to incorporation in the pigment, introduction of objectionable amounts of soluble salts into the pigment during treatment is effectively avoided. The presence of relatively large amounts of soluble salts in the pigment adversely affects the durability qualities of paints and coating compositions in which the pigment may be incorporated, and is particularly deleterious in instances where such paints and coating compositions are employed in exterior applications. Due to the adsorptive nature of the pigment, soluble salts cannot be completely removed by washing or other known treatments, and when present in the pigment in amounts up to substantially .25% will not seriously impair pigmentary properties. Such amounts are relatively minor and negligible and are unavoidably present in the pigment, due to normal processing and as impurities introduced from materials employed in pigment production. It will be seen, therefore, that the present invention affords the production of treated pigments substantially free from soluble salts and by a process which avoids any possibility of their introduction or addition to the pigment during treatment. Furthermore, an improved pigment is provided which will contain less than substantially .25% of water-soluble salts, thus rendering the same particularly adapted for incorporation in outside paints or coating compositions with consequent assurance of maximum film durability.

The term "titanium pigment", here and in the appended claims, includes pigments containing straight titanium dioxide or titanium oxide, chemically combined or associated with other constituents, such as calcium sulfate, barium sulfate, silica, magnesium silicate, and other silicate extenders. Likewise, the term embraces titanates, such as those of barium, calcium, zinc, strontium, etc.

I claim as my invention:

1. A process for producing a stable, light and weather-resistant titanium pigment substantially free of soluble salts, comprising separately precipitating and purifying by washing hydrated aluminum oxide, maintaining the purified product in moistened condition, and while in such state, blending from about .1% to 10% thereof with an aqueous suspension of a previously calcined titanium pigment.

2. A process for producing a stable, light and weather-resistant titanium pigment substantially free of soluble salts, comprising separately precipitating and purifying by washing hydrated aluminum oxide, and, without drying the purified product, suspending from about .1% to 2% thereof in an aqueous medium, and thereafter blending the resultant suspension with a slurry of previously calcined titanium pigment.

3. A process for producing a stable, light and weather-resistant titanium pigment substantially free of soluble salts, comprising separately reacting a water-soluble aluminum salt with a precipitating agent to obtain a water-insoluble aluminum compound from the group consisting of hydrated aluminum oxide and aluminum phosphate, purifying the resultant precipitate to remove soluble salts therefrom, maintaining the purified product in moistened condition, and while in such moistened state, incorporating from about .3% to 2% thereof in a previously calcined titanium pigment while the latter is in aqueous slurry.

4. A process for producing a stable, light and weather-resistant titanium pigment substantially free of soluble salts, comprising separately reacting a solution of aluminum sulfate with an alkaline precipitating agent, washing the hydrated aluminum oxide precipitate obtained to remove soluble salts therefrom, maintaining the purified product in moistened condition, and while in such undried state, blending from about .1% to about 2% thereof with a suspension of a previously calcined titanium pigment.

5. A process for producing a stable, light and weather-resistant titanium oxide pigment substantially free of soluble salts, comprising separately reacting a solution of aluminum sulfate with an alkaline precipitating agent, washing the resultant hydrated aluminum oxide precipitate to remove soluble salts therefrom, and, without drying the purified product, blending an amount thereof with an aqueous slurry of a previously calcined titanium oxide pigment sufficient to intimately associate not more than 2% of said purified product with said pigment.

6. A process for producing a stable, light and weather-resistant titanium oxide pigment substantially free of soluble salts, comprising separately reacting a solution of aluminum sulfate with an alkaline precipitating agent, subjecting the resultant hydrated aluminum oxide precipitate to purification by washing, and without drying the purified product, substantially immediately blending the same with an aqueous slurry of previously calcined titanium oxide pigment, the amount so employed in blending being sufficient to intimately associate from about .1% to 2% with said pigment.

7. A process for producing a stable, light and weather-resistant titanium oxide pigment substantially free of soluble salts, comprising separately reacting a solution of aluminum sulfate with an alkaline precipitating agent, subjecting the resultant hydrated aluminum oxide precipitate to purification by washing, and without drying the resultant purified product, blending the same substantially immediately in an amount ranging from about .3% to 1.5% with an aqueous slurry of previously calcined titanium oxide pigment.

8. A process for producing stable titanium pigments substantially free from soluble salts, comprising separately precipitating a water-insoluble aluminum compound from the group consisting of hydrated aluminum oxide and aluminum phosphate, washing the same free of soluble salts, and without permitting the purified product to dry, intimately associating from about .1% to 2% of the same with a previously calcined titanium pigment.

9. A process for producing a stable, light and weather-resistant titanium pigment substantially free of soluble salts, comprising separately precipitating a water-insoluble compound of aluminum from the group consisting of hydrated aluminum oxide and aluminum phosphate, washing the same free of soluble salts, and while in freshly precipitated, undried condition, blending from about .3% to 1.5% of the purified compound with an aqueous suspension of a previously calcined titanium pigment.

10. A process for producing a stable titanium pigment substantially free from soluble salts, comprising separately precipitating and purifying by washing a water-insoluble aluminum compound from the group consisting of hydrated aluminum oxide and aluminum phosphate, conducting such precipitation and purification in the cold, without permitting either the precipitated or purified product to dry, blending from about .3% to 2% of the purified precipitate, while in aqueous slurry, with a previously calcined titanium pigment, and thoroughly agitating the resultant mixture to effect uniform distribution of said purified product throughout said pigment.

GORDON D. PATTERSON.